United States Patent [19]

Cirne

[11] Patent Number: 5,625,763
[45] Date of Patent: Apr. 29, 1997

[54] METHOD AND APPARATUS FOR AUTOMATICALLY GENERATING FOCUS ORDERING IN A DIALOG ON A COMPUTER SYSTEM

[75] Inventor: Lewis K. Cirne, Sunnyvale, Calif.

[73] Assignee: Apple Computer, Inc., Cupertino, Calif.

[21] Appl. No.: 435,776

[22] Filed: May 5, 1995

[51] Int. Cl.$^6$ .................................................. G06F 17/00
[52] U.S. Cl. ...................... 395/133; 395/326; 395/347; 395/352
[58] Field of Search ......................... 395/133, 118, 395/117, 135, 138, 141, 145, 148, 149, 155, 156, 157, 158, 161; 364/419.14, 419.15

[56] References Cited

U.S. PATENT DOCUMENTS

| | | | |
|---|---|---|---|
| 5,510,811 | 4/1996 | Tobey et al. | 345/157 |
| 5,544,299 | 8/1996 | Wenstrand et al. | 395/155 |

OTHER PUBLICATIONS

"The C Programming Language", Second Edition, by Brian W. Kernighan and Dennis M. Ritchie, Prentice Hall Publishers, Copyright 1988, 1978, pp. 110, 119–120, 253.

"Microsoft Windows 3.1 Programmer's Reference", vol. 1, Overview, Microsoft Press, Copyright 1987–1992, pp. 50–53.

"ResEdit Reference for ResEdit" Chapters 1 and 4, Addison–Wesley Publishing Company, Inc. Copyright 1991, pp. 1–5, 51–85.

"Macintosh Tool Box Essentials," Chapter 6, Addison–Wesley Publishing Company, Inc., Copyright 1992, pp. 6–1 thru 6–172.

Brian W. Kernighan and Dennis M. Ritchie, entitled "The C Programming Language," pp. 110–120, 250–253 (Appendix B), 1988.

*Primary Examiner*—Almis R. Jankus
*Attorney, Agent, or Firm*—Helene Plotka Workman

[57] ABSTRACT

A method and apparatus provides for automatic generation of an intuitive, logical focusing order for items in a dialog window in a computer system. The focus ordering can be generated dynamically at runtime or statically. In particular, the focusing order is based on the locations and types of the items in the dialog box and is generated as follows. A customizable spatial comparison function, called herein "comparison function", is generated such that two items can be compared and an ordering of the items determined. The spatial comparison function extrapolates or imposes on each item being compared a region which is defined by the extent of the item's bounds. The regions are then compared to determine the focus ordering of the item. The items in the dialog box are sorted using the comparison function. The items are then grouped based on their locations and their types. Items that are of a similar type and in the same horizontal or vertical line are grouped together. Any items not yet assigned to a group and whose bounding regions intersect with any existing group's bounding region are added to that existing group. The item groups are then sorted using the comparison function. A focus order list is formed by iterating through the groups in order and iterating through the items in each group in order to form a list that contains an intuitive focus ordering for the items in the dialog.

24 Claims, 13 Drawing Sheets

GROUP DATA STRUCTURE

GROUP LIST

METHOD AND APPARATUS FOR AUTOMATICALLY GENERATING FOCUS ORDERING IN A DIALOG ON A COMPUTER SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. In particular the claim of copyright protection extends to code and pseudocode in the Appendices and artwork in the FIGURES.

FIELD OF THE INVENTION

The present invention relates generally to items displayed on a computer display screen and, more particularly, to navigation via an input device among editable items displayed in a window on a computer display screen.

BACKGROUND OF THE INVENTION

Computer systems, particularly graphically-based computer systems, employ various mechanisms to display information to a user and to prompt and allow a user to provide information or modify settings before executing a command or otherwise receive input from the user. Typically, such mechanisms are called "dialog windows", "dialog boxes" or simply "dialogs." Herein, the term dialog will be used to generally denote any of the above and to encompass any screen display having one or more editable or static user interface items or controls. A dialog can display information to the user, allow the user to change information and allow the user to enter additional information. A dialog may occupy an entire screen display or a portion, thereof, e.g. a window. Typically, software programs create and operate dialogs using interfaces with the underlying operating system of the computer system on which they are executing. The operating system generally creates and manages the dialogs in response to requests from the software program and input from the user.

Generally, a dialog can contain one or more items with which the user can type text, choose options, or direct the action of a particular command. An item can be either editable or non-editable. A non-editable item is either an item which is static in that it cannot be altered by a user or an item which is editable by a user but which is directly controlled by a software program other than the underlying operating system or other software program responsible for creating and managing the dialog.

In the latter case, a non-editable item may in actuality be user-editable, but the user's input is directed to the software program rather than the underlying operating system. Thus, from the operating system's perspective it is unknown whether such an item is editable or non-editable. From the software program's perspective, however, such an item is user-editable and the software program responds directly to the user's input. For information on how a software program creates such non-editable or software program-controlled items, see "Inside Macintosh", Vol. 1, Chapter 13, Addison-Wesley Publishing Company, Inc., 1985, herein incorporated by reference.

An editable item allows a user to edit/change the contents and/or state of the item. For example, with reference to the print dialog 20 shown in FIG. 1A, radio button 22a is an editable item, while the Printer Effects static text 22c is typically a non-editable item. Examples of various types of items include, but are not limited to buttons, check boxes, static and editable text, pictures and icons, as shown in FIG. 1A and further illustrated in FIG. 1B. The above-listed items are predefined items. In some systems an applications developer also can create user-defined or customized items.

If a user clicks on button 23, the options specified in the dialog 20 are used when printing a document. The term "click" is defined to include the act of the user placing the cursor over the button and selecting the button, e.g. depressing a button on the mouse or pressing a RETURN key on a keyboard. Dialog 20 also contains 4 check boxes, all of which have associated static text. For example, check box 22d has static text "Font Substitution?" associated with it. In some implementations the check box and the associated text are considered a single item, i.e. the term "check box" is used to cover the input box and the static text. In other implementations the check box and the associated text may be considered separate items. The same applies for radio buttons and the text associated therewith. While the dialog is active on a screen, a user can click on the checkbox, thereby toggling the check box between chosen and unchosen states.

Many operating systems or computer software programs have a Dialog Manager that manages or oversees the use of dialogs. The Dialog Manager reads a description of the dialog and the items inside the dialog and then draws the dialog and processes user actions that affect the dialog. The Dialog Manager's duties include manipulating items in a dialog box, including but not limited to, drawing an item, erasing an item, changing the appearance of an item and overseeing the handling of any event which affects the item.

Dialogs generally contain multiple items. Some computer systems provide for navigation among the editable items so that a user's focus can be transferred among the editable items in the dialog window. Generally, when the focus is on a particular item in the dialog box that item is active and capable of receiving user input. The focus is typically transferred by a user via an input device such as a mouse, keyboard, pen, speech recognition device, etc. . . For example, in a computer system having a dialog which is keyboard navigable, the focus is typically transferred among the items in the dialog window in response to a user pressing a particular key on the keyboard, e.g. the tab key, and the user's keystrokes are applied to the currently focused item. The term "full keyboard navigation", as well as derivatives thereof, is used to denote a system in which there is navigation among items known by the system to be editable.

Using a pointing device such as a mouse or pen a user can specifically and arbitrarily direct the change in focus from a first item to a second item, the first and second items not necessarily being contiguous in location or otherwise related. With a keyboard, however, a user is generally limited to navigating through the items in a particular pre-determined order. This navigation ordering is referred to herein as the "focus ordering" of the items in the dialog. Generally, the focus ordering of editable items in a dialog of a particular software program is predetermined by the developer of the software program. For example, where a user tabs through the items in a dialog, pressing tab while the focus is on a first item will shift the focus to a second predetermined item.

For example with reference again to FIG. 1A, if item 22b follows item 22a in the focus ordering for the dialog 20, then changing the focus ordering in a sequential manner, e.g. via an TAB key on a keyboard device, when item 22a is the focus will shift the focus to item 22b. As the focus, item 22b is then capable of receiving input from the input device.

Generally, the developer of a software program determines the focus ordering of the items in a dialog box and then uses the Application Program's Interface ("API") of the underlying operating system to specify that focus ordering. For example, a developer of a software program written for the Windows, version 3.1 operating system environment, available from Microsoft Corporation, uses the CreateDialog or DialogBox functions to create dialogs. These functions are described in the "Microsoft Windows 3.1 Programmer's Reference", Vol. 1, pages 50–53, Microsoft Press, 1987–1992, the disclosure of which is herein incorporated by reference. In Windows 3.1 items in a dialog box are referred to as "controls". For the purposes of the following description on Windows 3.1 only, the term control is used herein to refer to items in dialog boxes on Microsoft Windows 3.1.

In Windows 3.1, a dialog is described by a dialog box template, an application resource, is a description of the dialog box which includes information such as the height and width, the type of border and the style of the dialog box, as well as the controls contained therein. After loading a dialog box template from the application's executable file into memory, these functions then create a pop-up window that matches the template's specifications, using the information in the template to create the dialog box, position it, and create and position the controls for the dialog box.

In Windows 3.1, a control can have one or more associated styles which generally describe attributes pertinent to that control, including the manner in which the input focus is shifted to the control. The WS_TABSTOP style specifies that a user can shift the input focus to particular control by pressing the TAB key or SHIFT+TAB keys. Typically, every control in the dialog box has this style, so that a user can shift the input focus from one control to the other. If two or more controls are in the dialog box, the TAB key shifts the input focus to the controls in the order in which they were created. The SHIFT+TAB keys shift the input focus in reverse order.

The WS_GROUP style specifies that a use can move the input focus within a group of controls by using the arrow keys. The DOWN ARROW and RIGHT ARROW keys move the input focus to controls in the order in which they have been created. The UP ARROW AND LEFT ARROW keys move the input focus in reverse order.

In the System 7.5 operating system from Apple Computer, keyboard navigation is provided for editable text items. The focus order of the keyboard navigation for those editable text items is the order in which the items are created in the dialog.

Thus, in general, in the above-referenced systems, the focus ordering of items in a particular dialog box is determined by the order in which such items were created.

In RESEDIT, a resource editor available from Apple Computer, graphic resources such as icons, menus and dialogs can be created. A description of RESEDIT can be found in ResEdit Reference For ResEdit 2.1, Addison-Wesley Publishing Company, Inc., 1991, the disclosure of which is herein incorporated by reference. A dialog is described by a "DLOG" resource, which references a dialog item list, called a "DITL" resource. Items can be reordered once the dialog is created, but the changes must be done statically before runtime of the software program containing the dialog.

In these systems, the focus ordering is based on the creation order of the controls. Thus, in designing a dialog, a developer may spend time and other resources determining a creation ordering of the controls which also makes sense from a focus ordering standpoint. If a developer does not take into account focus ordering when creating a dialog, the focus ordering that results may be illogical and confusing to a user.

Moreover, variations in the focus ordering schemes and philosophies of different developers may result in inconsistent focus ordering among dialog windows in a particular software program, as well as inconsistencies across software programs in a computer system. These inconsistencies in focus ordering can create confusion and unpredictability for a user.

For example, a first developer may design the focus ordering with a left-right orientation so that the focus is transferred from items in a left-to-right manner, while a second developer may design the focus ordering with a top-bottom orientation so that the focus is transferred from items in a top-to-bottom manner. Thus, a user may become confused as to whether a particular dialog window has a focus ordering which is left-to-right or top-to-bottom.

Other problems can arise when a dialog window which was created without keyboard navigation capabilities is transferred, e.g. ported, to a computer system which provides keyboard navigation capabilities for dialog windows. In this case, a focus ordering may not even have been defined by the developer of the dialog window.

For example, a developer creating a dialog window for a software program to be used in a computer system which does not provide full keyboard navigation of dialogs probably will not design a focus ordering for the items in the dialog window. If the software program is ported to a computer system that does support keyboard navigation for dialog windows, then a focus ordering is needed to navigate through the items using the keyboard. In that situation, it is desirable to have a mechanism for automatically defining a focus ordering which is logical given the items in the dialog window.

SUMMARY OF THE INVENTION

It is an object of the present invention to provide automatic generation of an intuitive, logical focus ordering in a dialog.

It is an object of the present invention to determine an intuitive, logical focus ordering based on visual, spatial relationships and groupings of the items in a dialog.

Briefly, the present invention provides a method and apparatus for automatically generating an intuitive, logical focusing order for items in a dialog window. In particular, the focusing order is based on the locations and types of the items in the dialog box and is generated as follows. A customizable spatial comparison function, called herein "comparison function", is generated such that two items can be compared and an ordering of the items determined. The spatial comparison function extrapolates or imposes on each item being compared a region which is defined by the extent of the item's bounds. The regions are then compared to determine the focus ordering of the item. This customizable comparison function, allows the focus ordering to be tailored for various configurations of the operating system, e.g. left-to-right or right-to-left based systems.

The items in the dialog box are sorted using the comparison function. The items are then grouped based on their locations and their types. Items that are of a similar type and in the same horizontal or vertical line are grouped together. Any items not yet assigned to a group and whose bounding regions intersect with any existing group's bounding region are added to that existing group. The item groups are then sorted using the comparison function. Since the items were sorted before the groups were formed, the items are sorted within their groups. Thus, a list can be formed by iterating through the groups in order and running through the items in each group in order to form a list that contains an intuitive focus ordering for the items in the dialog.

In a first embodiment of the invention, non-editable items are separated from editable items, and only editable items are sorted and grouped. In a second embodiment of the invention, all items are sorted and grouped and non-editable items are later separated or otherwise skipped during navigation by a user through the items in the dialog window.

The invention can be used to dynamically create a focus ordering at runtime or to statically create a focus ordering prior to runtime.

The present invention provides numerous advantages by automatically generating an intuitive, logical focus ordering for items in a dialog window. For dialog windows being newly designed and created, this results in a reduction in developer time and other valuable resources spent on developing dialog windows. For existing dialog windows, the present invention can be used to automatically generate a logical and intuitive ordering for the items in the dialog window. In either case, the invention provides a mechanism for creating consistency in the focus ordering among dialog windows in a particular software program and consistency in dialog windows across software programs running on a computer system, and, if used widely enough, even consistency across computer systems, thereby reducing user confusion and creating a level of predictability for the user.

These and other features of the present inventions, and the advantages offered thereby, are explained in detail hereinafter with reference to specific embodiments illustrated in the accompanying drawings.

DETAILED DESCRIPTION

To facilitate an understanding of the invention, its features are described hereinafter with reference to a particular implementation, namely dialogs in a computer system having a window-based graphical user interface. It will be appreciated, however, that the practical applications of the invention are not limited to this particular environment. Rather, it will be found to have utility in any situation in which one or more editable or static user interface items are displayed to a user.

Figure 1A:
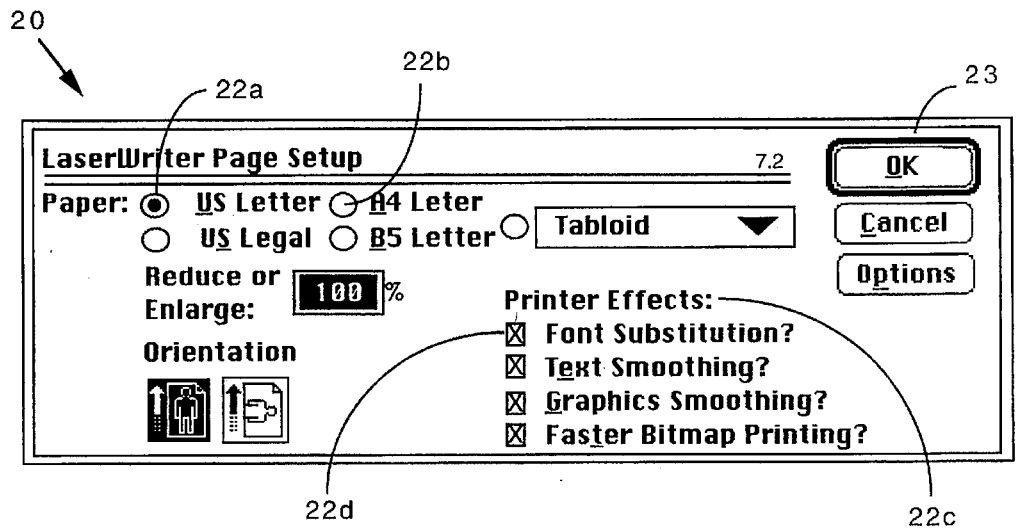
FIG. 1A is an example of a dialog window.
Figure 1B:
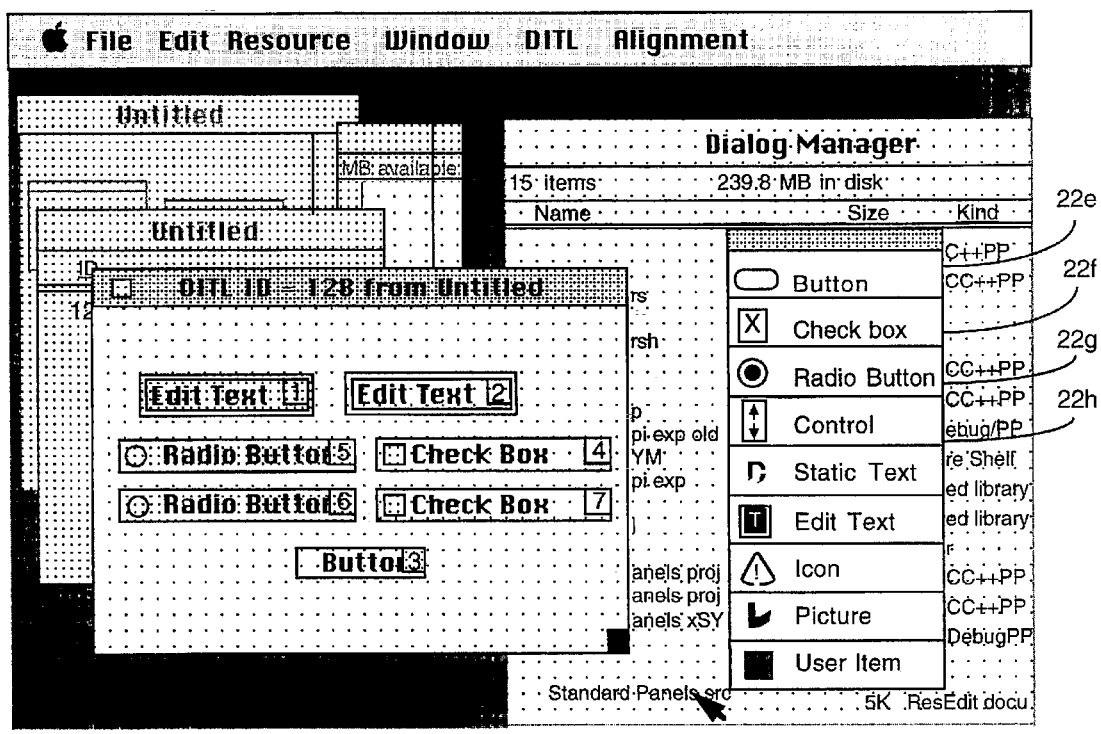
FIG. 1B illustrates examples of some types of items in a dialog window.

As previously discussed, FIG. 1A is an example of a dialog 20 having one or more items 22. FIG. 1B illustrates various types of items 22 such as a button 22e, a check box 22f, a radio button 22g, and a control 22h.

Figure 2:
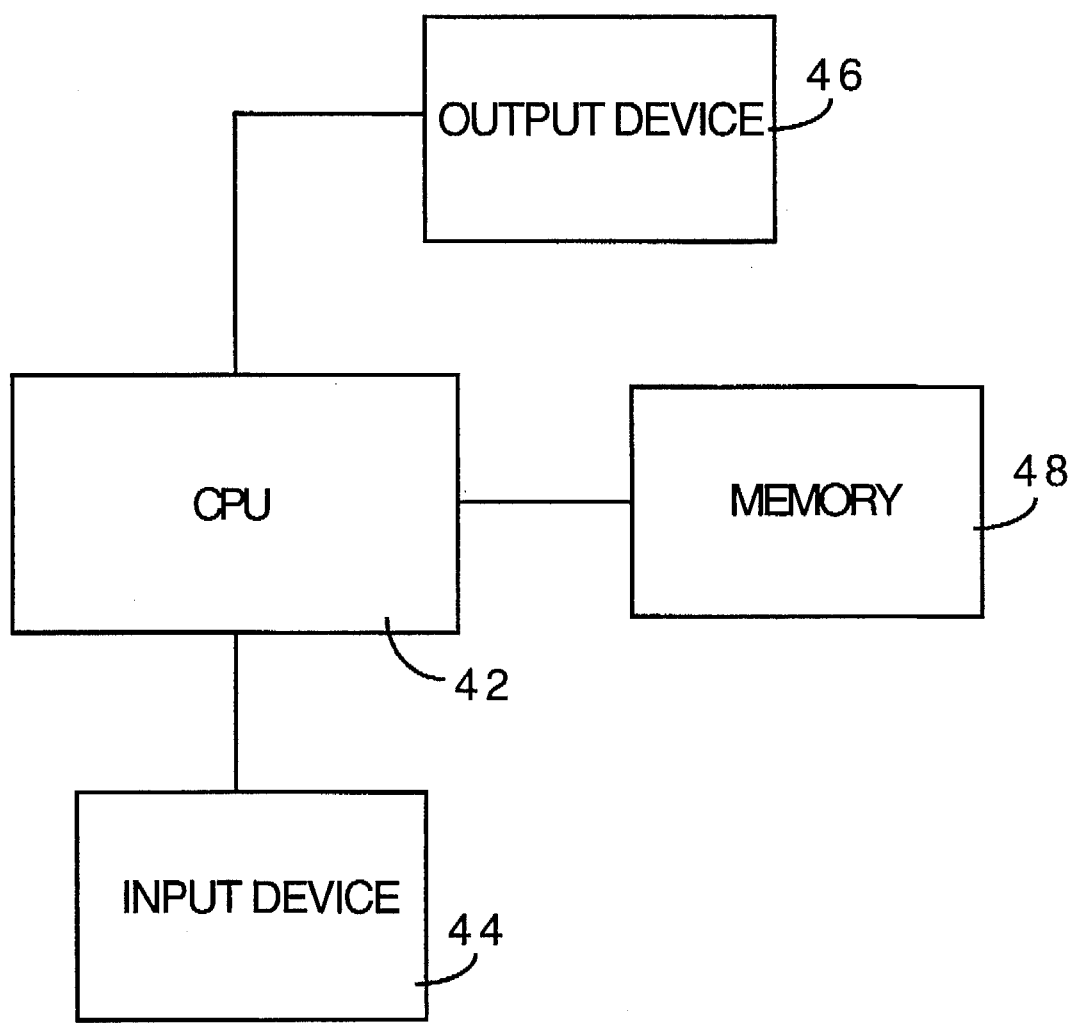
FIG. 2 generally depicts a computer system incorporating the invention.

FIG. 2 generally depicts a computer system 40 incorporating the invention. The computer system 40 includes a processor ("CPU") 42 connected to an input device 44, an output device 46 and storage 48. The computer system 40 of FIG. 2 is an example of a computer system incorporating the invention. It will be appreciated by those of ordinary skill in the art, that the invention is equally applicable to other computer systems.

The processor 42 is any central processing unit or other computer processing unit. Preferably, it runs a graphical user interface-based operating system.

The input device 44 receives input from a user of computer system 40. For example, among other things, input device 44 can be a keyboard, a mouse, a pen, a speech recognition unit or joystick. The computer system 40 may include a plurality of input devices 44. For example, the computer system 40 may include a keyboard and a mouse.

The output device 46 displays output to a user of computer system 40. For example, among other things, output device 46 can be a display monitor having a display screen or a printer.

Storage 48 can be internal storage such as memory, hard disk or a non-volatile integrated circuit memory system, or the like, or external storage such as an external disk drive or floppy drive, or the like. Memory can be random access memory ("RAM") alone and/or a combination or RAM and read-only memory ("ROM").

Figure 3:
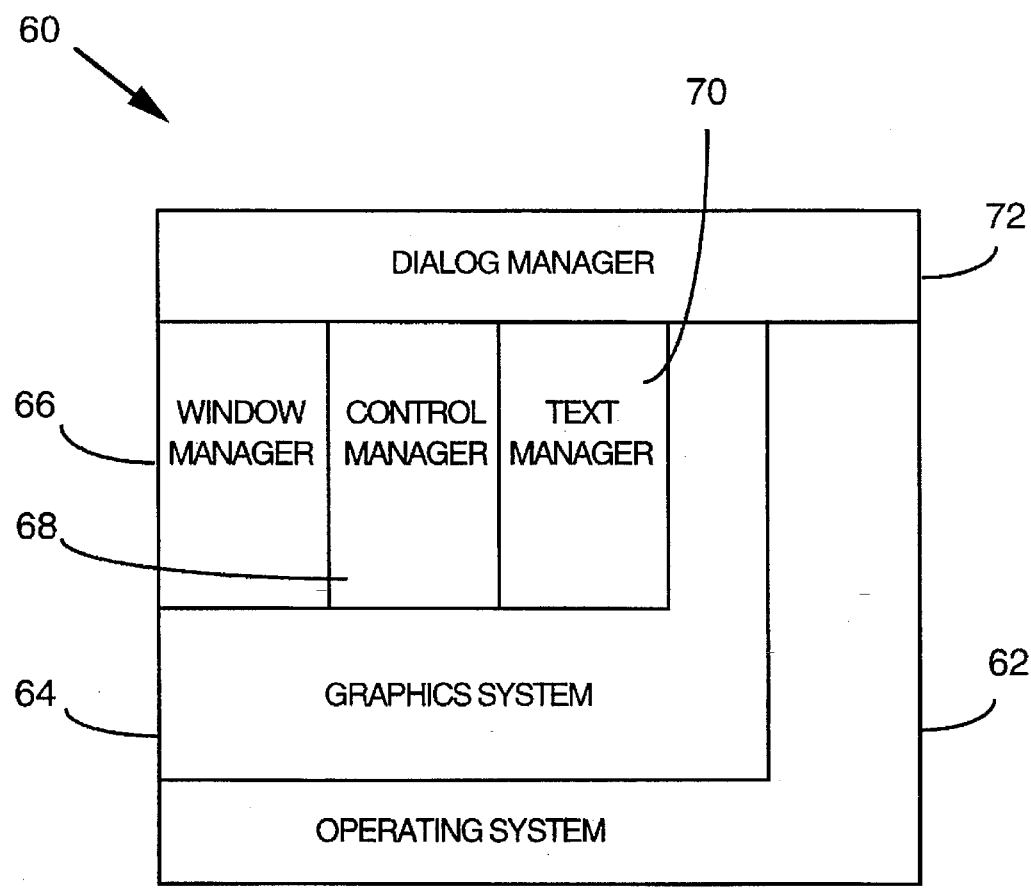
FIG. 3 generally depicts software layers in a computer system of FIG. 2.

FIG. 3 illustrates generally an example of layers 60 of software that can be used in a computer system of FIG. 2 used in the creation and manipulation of dialogs. Such layers of software are found in the Apple Computer operating system described in Inside Macintosh, Vols. I–VI, published by Addison-Wesley Publishing Co., 1985–1991, herein incorporated by reference.

An operating system 62 provides memory management, input and output to disk and other media like a keyboard and a mouse and resource management to access and handle DLOG and DITL resources. A graphics system 64 operates on top of the operating system 62 and provides drawing routines for the display screen and other output devices, drawing, among other things, icons, pictures and simple shapes. For detailed information on a graphics system see "Inside Macintosh: Imaging with Quickdraw, Addison-Wesley Publishing Co., 1994, herein incorporated by reference.

A window manager 66 operates on top of the graphics system 64 and uses the graphics system to visually display graphical information in windows on the display screen. For detailed information on a window manager see "Inside Macintosh: Macintosh Toolbox Essentials", Chapter 4, Addison-Wesley Publishing Co., 1992, herein incorporated by reference.

A control manager 68 operates on top of the graphics system 64 and provides user interface elements that interact with the mouse. Such user interface elements include, but are not limited to, buttons, radio buttons and check boxes. For detailed information on a control manager see "Inside Macintosh: Macintosh Toolbox Essentials", Chapter 5, Addison-Wesley Publishing Co., 1992, herein incorporated by reference.

A text manager 70 operates on top of the graphics system 64 and provides services for drawing and manipulating editable and static text. For detailed information on a control manager see "Inside Macintosh: Text", Addison-Wesley Publishing Co., 1993, herein incorporated by reference.

A dialog manager 72 operates on top of the operating system 62, the graphics system 64, the window manager 66, the control manager 68 and the text manager 70 and provides services for creating and otherwise manipulating dialogs and the items therein. For a detailed description of a dialog manager see "Inside Macintosh: Macintosh Toolbox Essentials", Chapter 6, Addison-Wesley Publishing Co., 1992, herein incorporated by reference. It will be appreciated by a person of ordinary skill in the art that other configurations of software layers can be used to implement the invention.

Typically, a dialog 20 is displayed to a user on output device 46 and the user navigates through the items 22 in the dialog using an input device 44. The user also uses an input device 44 to edit the contents of an editable item in dialog.

In computer systems 40 where an input device 44 does not generally allow a user to arbitrarily focus on, i.e. point at, a particular item in a dialog window, a pre-determined focus ordering determines the path of a user's navigation among the items in a dialog window. For example, in a computer system 40 having a pen input device, a user can arbitrarily point the pen at a particular item in the dialog window, but in a computer system 40 having a keyboard input device, a user is unable to arbitrarily point at a particular item and is typically restricted to using the keyboard to navigate through the items of the dialog window. Typically, specially-designated keys such as the ARROW keys and the TAB key are used to navigate through the items. However, in some systems, it is possible to assign a function key to a particular item so that pressing the function key shifts the focus to the particular item to which that function key was assigned, thereby allowing a user to arbitrarily focus on a particular item by using the assigned function key for that item.

Even if a computer system 40, has an input device 44 that is capable of permitting a user to arbitrarily focus, a software program may restrict a user's ability to use such an input device to arbitrarily focus on a particular item. For example, in a computer system having both a keyboard and a mouse, a software program may limit the user to using the keyboard to navigate among items in a dialog and may not permit function keys to be assigned to items. Even if a system does permit the assignment of function keys to items, a user may choose not to use that feature.

Figure 4:
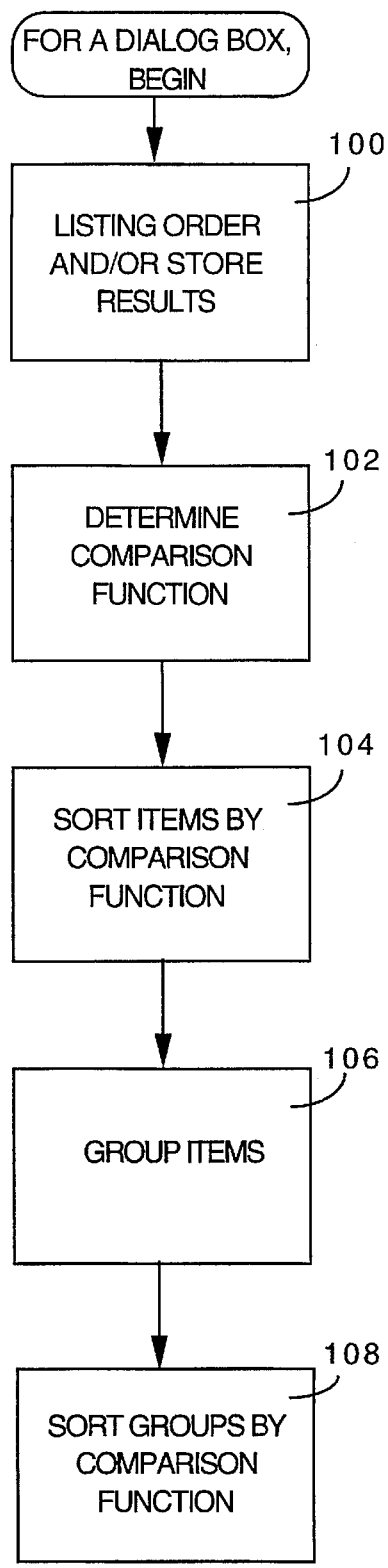
FIG. 4 is a flowchart generally depicting steps performed in generating a focus ordering according to the invention.

In any of the above-noted situations where the focus ordering is not being shifted arbitrarily, a pre-determined focus ordering determines the path of a user's navigation among items in a dialog window. FIG. 4 generally shows the steps performed to determine a focus ordering for items in a dialog window in a computer system incorporating the invention.

At step 100 a comparison function is determined or otherwise customized or selected. The comparison function can be tailored for the configuration of a particular operating system. For example, the comparison function can be tailored for the textual orientation of the operating system, e.g. left-to-right or right-to-left. In a left-to-right operating system, e.g. an operating system that displays Romanbased languages, a comparison function is determined which is tailored for a left-to-right textually oriented system.

In a dialog in a left-to-right text-based system, a preferred focus ordering would extend from the upper left corner of the dialog and proceed to the lower right corner of the dialog. In a dialog in a right-to-left text-based system, a preferred focus ordering would extend from the upper right corner of the dialog and proceed to the lower left corner of the dialog. For descriptive purposes herein, the terminology "highest" and "topmost" are used when comparing item regions. An item the highest or topmost in a set of items when its highest point is closer to the top of the display screen than the highest points of the other items in the set. The highest point of an item is that part of the item which is closest to the top of the display screen. For example, in FIG. 1A, as between items 22a and 23, item 23 is the highest or topmost. The terms leftmost and rightmost are used in a similar manner. The upper left corner of the display screen is typically denoted by coordinates (0, 0), while the lower right corner of the display screen is typically denoted by coordinates (screen vertical size, screen horizontal size) or (screen horizontal size, screen vertical size) depending on the system.

The comparison function determined at step 100 can be dynamically computed or can be selected from a set of predefined comparison functions. Preferably, the Dialog Manager has a plurality of predefined functions and determines at runtime which of the predefined functions is optimal to use. Such a determination may be based on the orientation or other characteristics of the Dialog itself. For example, for a dialog having a height which substantially exceeds its width, vertical alignment of items may take precedence over horizontal alignment of items in determining focus ordering.

In an alternative embodiment, a control panel, as commonly found on the Macintosh operating system and described in Inside Macintosh, Vol. VI, Chapter 10, Addison-Wesley Publishing Co., 1991, herein incorporated by reference, or other mechanism can be used to allow a user to specify one or more preferences regarding the orientation or other characteristics of the focus ordering. These preferences can then be used in determining which comparison function to use.

At step 102 items in the dialog window are sorted according to the comparison function determined at step 100. At step 104, items in the dialog window are grouped based on the items' location and type. Typically, items of the same type which are in horizontal/vertical alignment are grouped together.

At step 106, the groupings formed at step 104 are sorted using the comparison function determined at step 100. At block 108, the focus ordering is preserved in storage, e.g. the focus ordering of the items is stored in a buffer in memory. The sorted ordering of the groups along with the sorted ordering of the items within each group produces a focus ordering. In essence, the focus ordering is determined by "traversing/moving/going" group by group and then item by item in each group.

Figure 5:
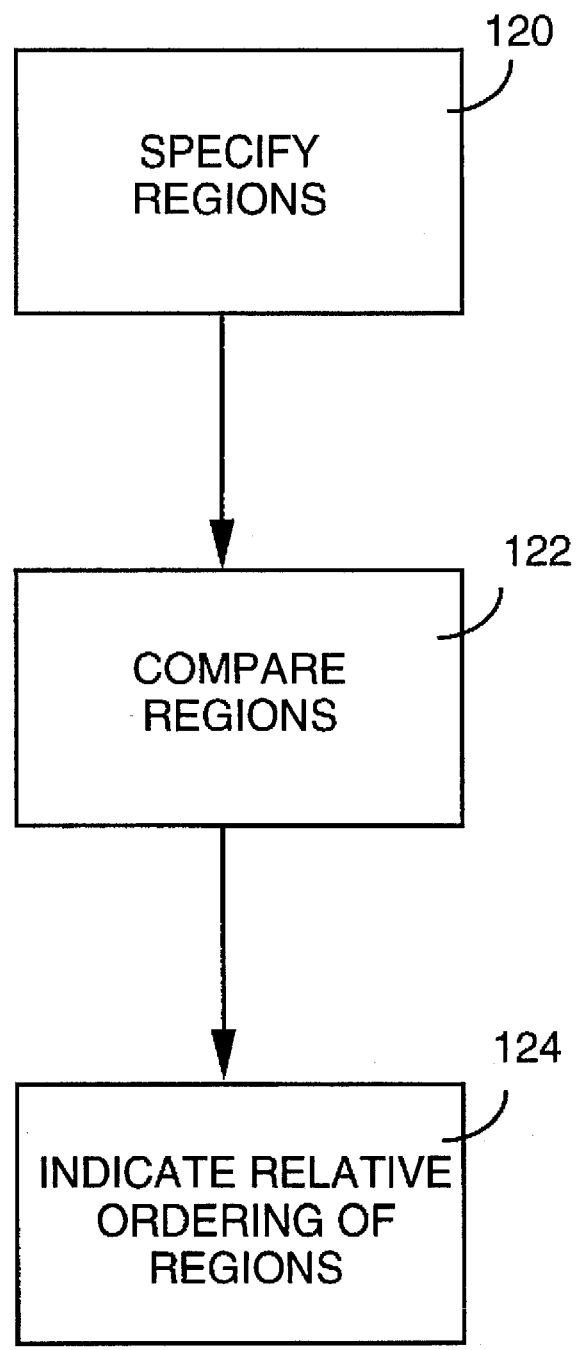
FIG. 5 is a flowchart depicting the steps performed by a rectangle comparison function of step 100 of FIG. 4.

FIG. 5 is a flowchart depicting the steps performed by a comparison function determined at step 100 and used at steps 102 and 106 of FIG. 4. In general, the comparison function compares the bounding extents or regions of a plurality of items and from that comparison determines the ordering of the items. A bounding extent or region is the smallest area that encloses the visible content of an item.

The comparison function can perform two-dimensional and three-dimensional comparisons, depending on the dimensional characteristics of the item. In a preferred embodiment, the bounding region of an item in two-dimensional space is a rectangle and in three-dimensional space is a cube. Using a rectangular or cubeshaped bounding region, depending on the number of dimensions, rather than other shapes such as, for example, circular, trapezoidal or other irregular shapes, may simplify the alignment determinations performed by the comparison function and the computation of the union of multiple bounding extents performed when grouping items. Preferably, the comparison functions accepts two bounding extents or regions, herein simply called "regions", as input and indicates the ordering of the regions relative to each other, i.e. which comes first and which comes second.

At step 120 comparison function inputs, i.e. regions, are defined. The inputs may be, for example, the regions for the items being compared. At step 122, the regions are compared to each other and at step 124 a relative ordering of the regions is determined and indicated.

Figure 6A:
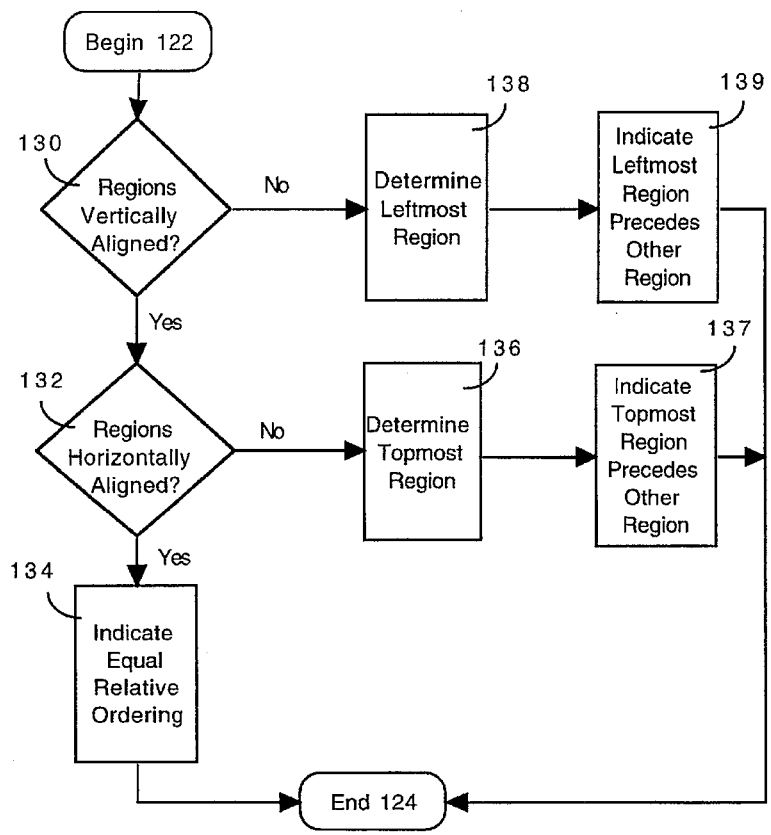
FIGS. 6A and 6B are flowcharts depicting the steps performed at steps 122 and 124 of FIG. 4 in a left-to-right textbased system and a right-to-left text-based system, respectively.
Figure 6B:
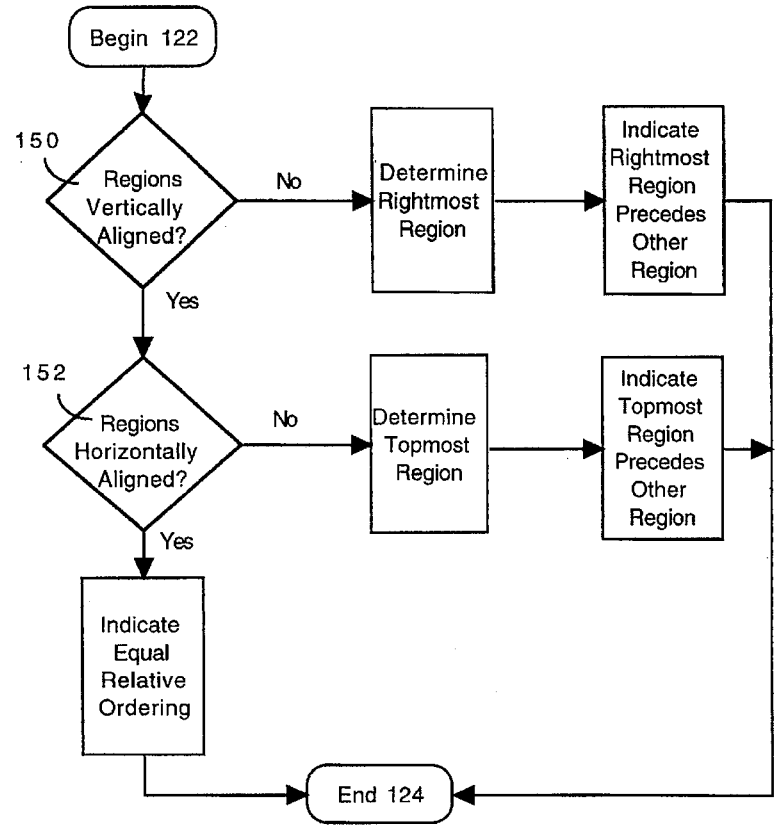

FIGS. 6A and 6B are flowcharts depicting generally the steps performed at step 122 and step 124 of FIG. 5 by comparison functions based on textual orientation. FIG. 6A relates to a left-to-right system, while FIG. 6B relates to a right-to-left system. The comparison functions of FIGS. 6A and 6B each accept as input two function inputs, also called regions, compare the inputs and return a relative ordering of the inputs.

At step 130, the function inputs are compared to determine whether they are in vertical alignment. Preferably, two regions are in vertical alignment when the leftmost point(s) of the regions have the same vertical coordinate or location on the display screen. If the regions are in vertical alignment, then at step 132 the regions are compared to determine whether the regions are horizontally aligned. If the regions are horizontally aligned then, at step 134, it is indicated that they are spatially equal for the purposes of the invention.

If at step 132, the regions are not horizontally aligned, then at step 136, the topmost region is determined. A first region is considered to be atop a second region when the highest point of the first region is higher than the highest point of the second region. At step 137, it is indicated that the region found to be the topmost region precedes the other region.

If at step 130, the regions are not vertically aligned, then at step 138, the leftmost region is determined. A first region is considered to be to the left of a second region when the leftmost point of the first region is left of the leftmost of the second region. At step 139, it is indicated that the region found to be the leftmost region precedes the other region.

To illustrate the determinations performed at steps 136 and 138, it is helpful to consider an example as follows. Consider two regions where the first region is a rectangle defined by corners having coordinates (2, 5), (2, 20), (10, 5), (10, 20), and the second region is a rectangle defined by corners having coordinates (5, 7), (5, 30), (15, 7), (15, 30). Coordinate (2, 5) is generally near the top left of the display screen, while coordinate (15, 30) below and right of coordinate (2, 5). The first and second regions are in neither vertical nor horizontal alignment. At step 136, the topmost point of the first region, row 2, is compared with the topmost point of the second region, row 5, such that the first region is found to be atop the second region. At step 138, the leftmost point of the first region, column 5, is compared with the leftmost point of the second region, column 7, such that the first region is found to be to the left of the second region.

In a preferred embodiment, the comparison function accepts two inputs and returns a value less than zero if the first input precedes the second input in the determined ordering at step 124 and returns a value greater than zero if the first input follows the second input in the determined ordering at step 124. If the two inputs are equal, the function returns a zero value. Appendix A includes code, written in the C programming language, relating to comparison functions. The routine CompareRectsInLeftBasedSystem accepts two rectangular regions as input and compares those regions based on a left-to-right text-based system. Likewise, the routine CompareRectsInRightBasedSystem accepts two rectangular regions as input and compares those regions based on a right-to-left text-based system.

The invention, however, is not limited to this particular implementation. It will be appreciated by a person of ordinary skill in the art that the comparison function can be easily adapted to accept more than two inputs and that the functionality described in the comparison function can be iteratively applied to return an ordering of those inputs. In an alternative embodiment, a comparison function is not dynamically provided, but rather it is statically defined and used in substantially all cases.

The comparison function determined at step 100 of FIG. 4 is used at step 102 of FIG. 4 in conjunction with any conventional sorting algorithm or routine to sort the items in the dialog. For example, the sorting algorithm can be a bubble sort or quicksort algorithm such as that provided by the qsort routine described in "The C Programming Language", Second Edition, Prentice Hall, 1988, 1978, at page 253, herein incorporated by reference. Also, Appendix A includes sorting routines SortTabGroups and SortTabOrderTable.

The sorting routine accepts as input the comparison function and a reference to a list of items and uses the comparison function to sort the items in the list. The comparison function preferably accepts two regions as input and returns an indication as which of the two regions is greater.

Figure 7A:
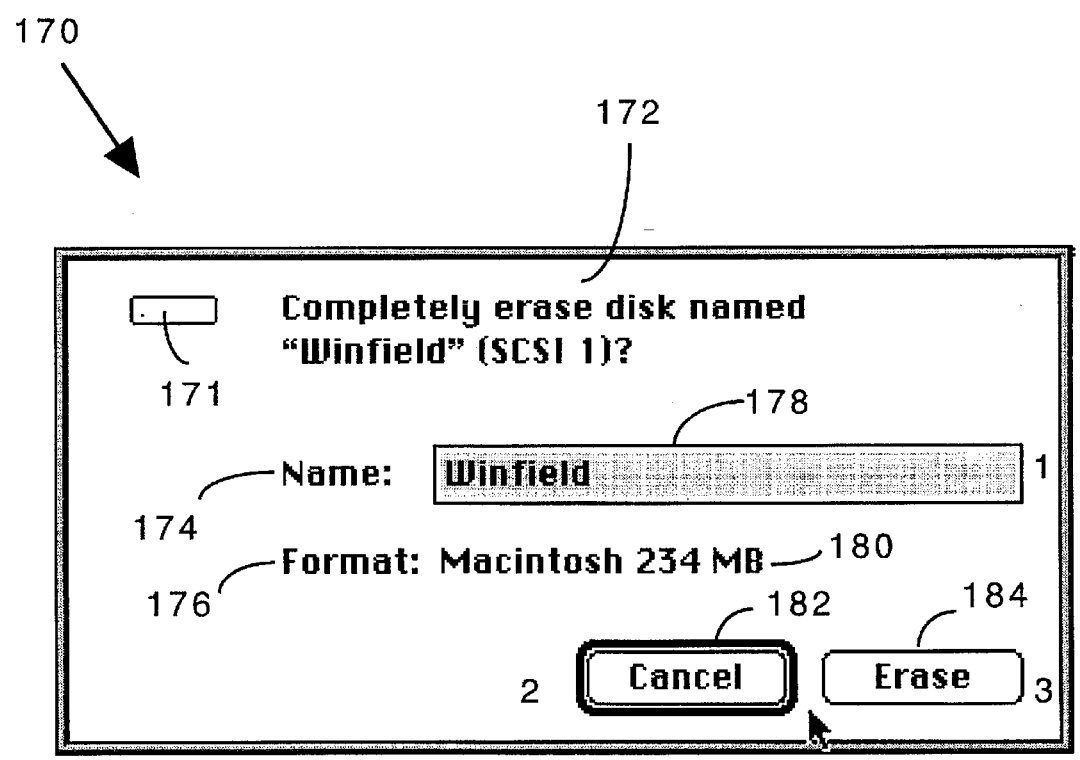
FIGS. 7A and 7B generally illustrate in alternative embodiments an ordering of items resulting from the step 102 of FIG. 3.
Figure 7B:
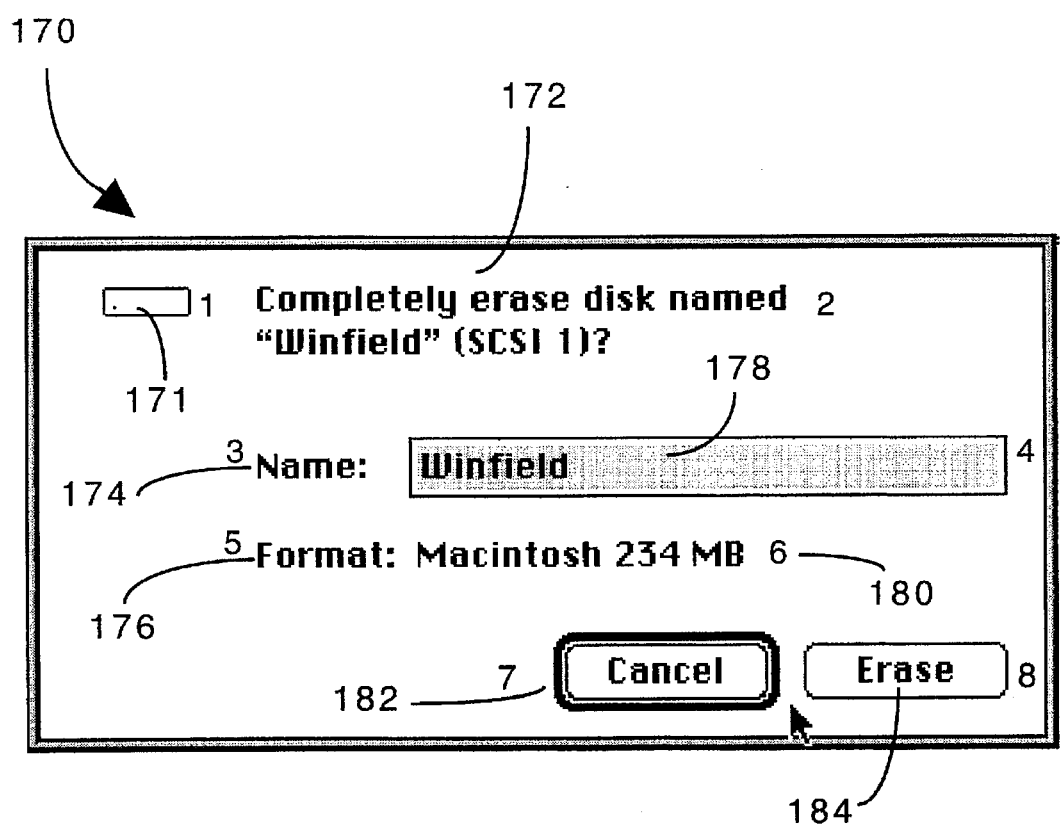

FIGS. 7A and 7B illustrate the sorting by comparison function at step 102 of items in a dialog 170 related to an erase disk operation. The comparison function used is configured for a left-based system.

Typically, in the MacOS operating system 7.5 from Apple Computer, a dialog like the one shown in FIGS. 7A and 7B appears after a user selects the Erase Disk menu option in the Finder. The dialog 170 contains a plurality of items, editable and noneditable, including an disk icon 171, three static text fields 172, 174 and 176, editable text fields 178 and 180 and buttons 182 and 184. Text field 176 asks the user to confirm the erasure of the disk, while text fields 174 and 176 indicate the nature of the editable text fields 178 and 180, respectively. A user clicks on either button 182 or button 184 to either cancel or initiate, respectively, the erase disk action.

For descriptive purposes, the ordering of the items that results from the sort by comparison function at step 102 is indicated by the ordered numbers appearing either to the immediate left or right of an item. For example, in FIG. 7A, the number 1 appearing to the right of the editable text field 178 indicates that field 178 is first in the ordering.

FIG. 7 A shows the ordering in an embodiment where only editable items are sorted and included in the ordering. In an alternative embodiment, as shown in FIG. 7B, all items are sorted, whether editable or non-editable, and the non-editable items are preferably removed from the focus ordering before the ordering is stored at block 108 of FIG. 4. Alternatively, if the non-editable items are included in the focus ordering stored at block 108, then the non-editable items are preferably skipped over at runtime as the focus ordering changes while a user is interacting with the dialog.

In FIG. 7A, the resulting order of the items after step 102 of FIG. 3 is text field 178, button 182 and then button 184. In FIG. 7B, the non-editable items are also given a position in the ordering. The resulting order of the items after step 102 of FIG. 4 is disk icon 171, static text field 172, static text field 174, editable text field 178, static text field 176, editable text field 180, button 182 and button 184.

Figure 8:
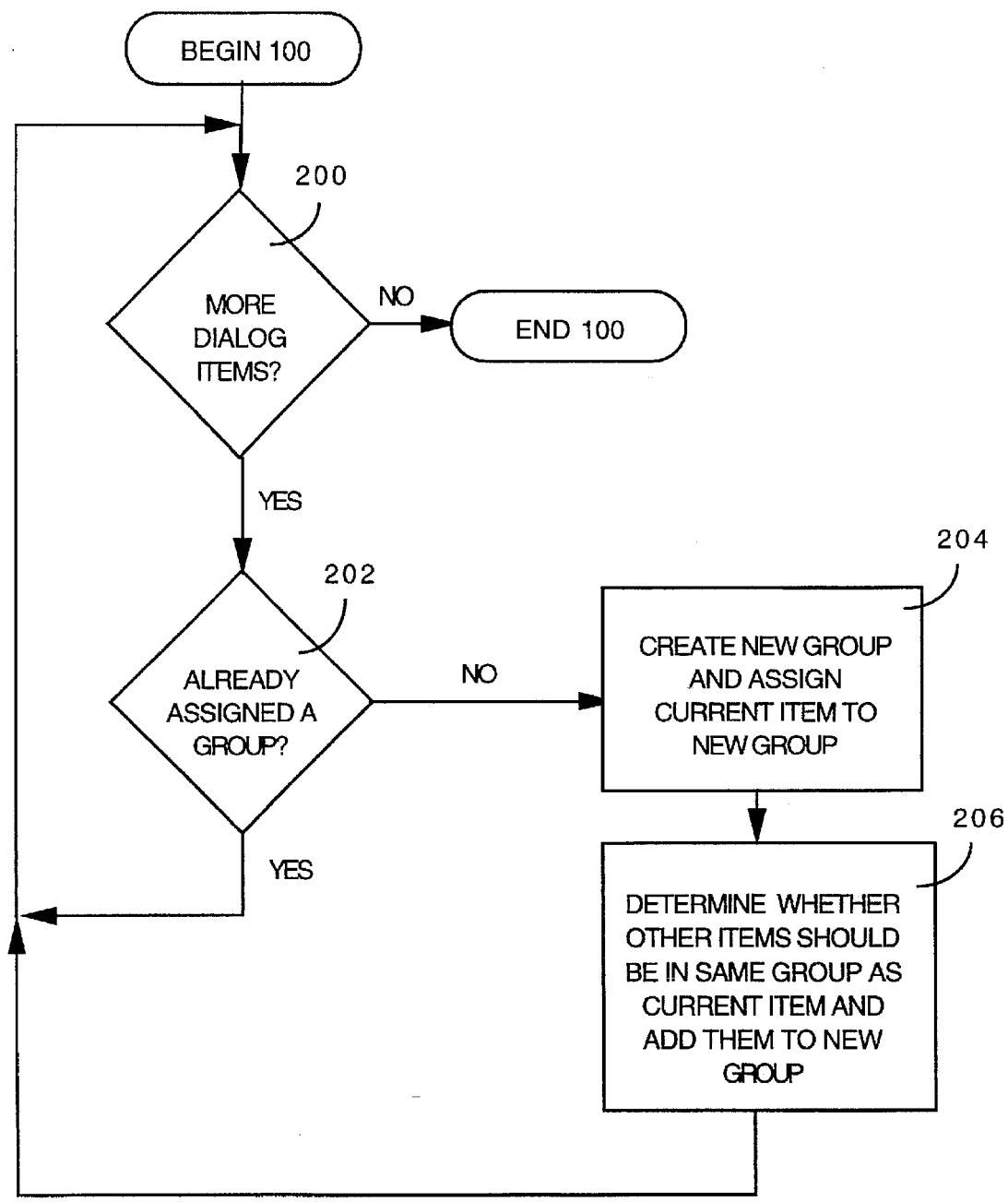
FIG. 8 is a flowchart generally depicting the steps performed at step 104 of FIG. 4.

FIG. 8 is a flowchart generally depicting the steps performed at block 104 of FIG. 4. In a preferred embodiment, items are grouped based on their locations and their types. Items that are of a similar type and in the same horizontal or vertical alignment are generally grouped together, with the exception of user items that are defined by an application or software program other than the system managing the dialogs. A group has an associated group bounding region which is defined as the union of the bounding regions of the items in the group. Any items whose bounding regions intersect with any exiting group's bounding region is added to that group and the group bounding region is updated to include the bounding region of the newly added item.

For each editable item in the dialog box, the steps at blocks 202–206 are performed. At step 200, it is determined whether there are any more editable dialog items which need to be examined. For descriptive purposes, the dialog item being examined and operated on at steps 202–206 is called the "current item". At step 202, it is determined whether the current item has already been assigned to a group. If so, then control returns to step 200. If not, then, at step 204, a new group is created and the current item is assigned to the new group. At step 206 it is determined whether any other items in the dialog should be in the same group as the current item and those items are added to the new group. Preferably, the decision as to whether to add an item to the new group is based on the location and type of the item relative to the current item. Control then returns to step 200.

In an alternative embodiment, steps 202–206 are performed for all items, whether editable or noneditable. In that case, at step 100, it is determined whether there are any more dialog items which need to be examined, irregardless of whether the items are editable or noneditable.

Figure 9:
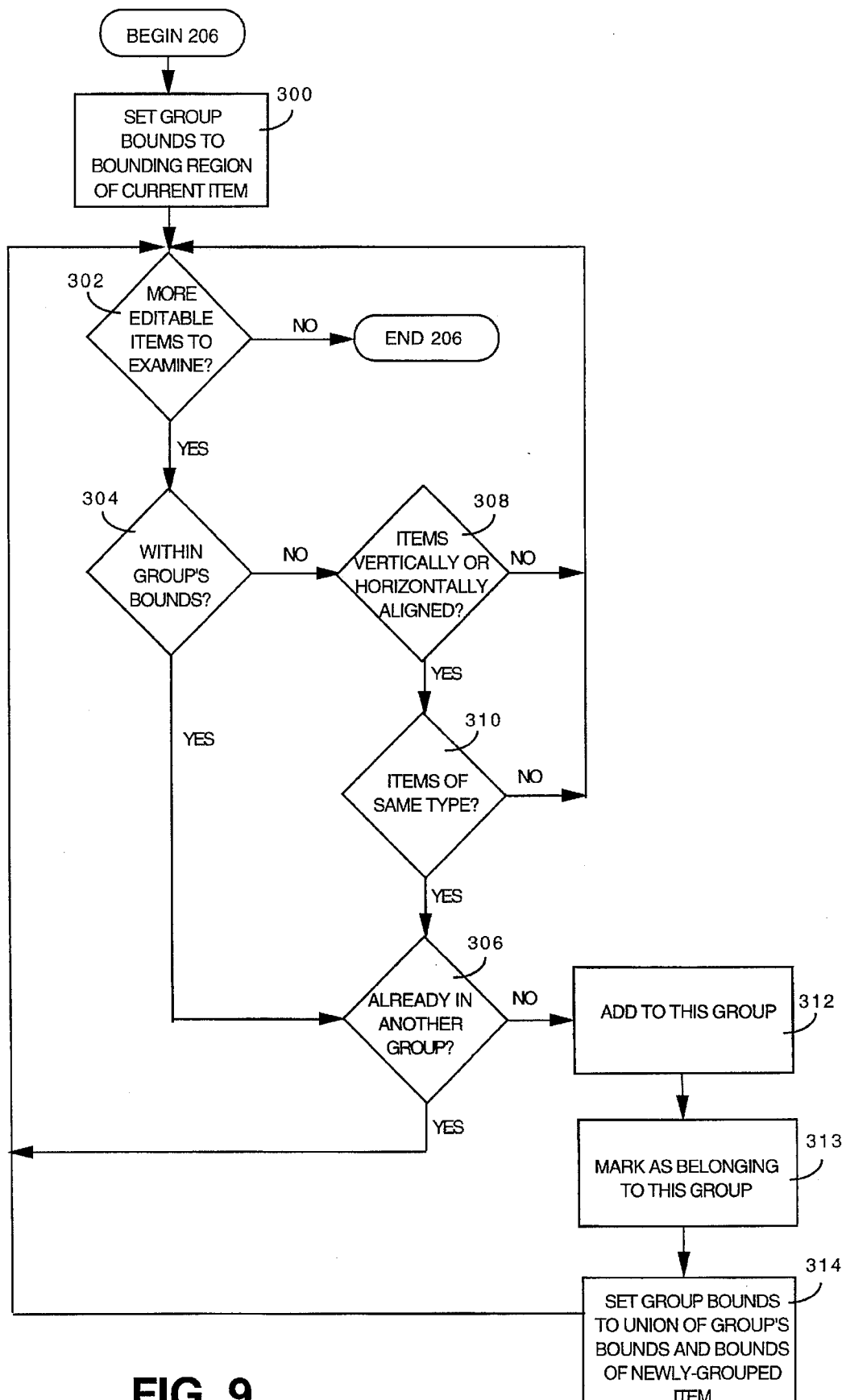
FIG. 9 is a flowchart generally depicting the steps performed at step 206 of FIG. 8.

FIG. 9 is a flowchart generally depicting the steps performed at block 206 of FIG. 8. At step 300, the new group's bounds are set to the bounding region of the current item. At steps 302–314, the other editable items in the dialog are examined and compared to the current item to determine which of those items should also be added to the new group and to add those items to the new group. At step 302, it is determined whether there are any more editable items to examine. For descriptive purposes, an item being examined is called a "comparison item". If there are no more items to examine, then control returns to step 208 of FIG. 8. If there are more items to examine, then an item is designated as the comparison item and at step 304 it is determined whether the comparison item is within the new group's bounds. If so, then control passes to step 306. If not, then at block 308 it is determined whether the current item and the comparison item are in vertical or horizontal alignment with each other. If not, then control passes to step 302. If so, then at step 310 the current item and the comparison item are compared to determine whether they are of the same type. If the two items are the same type, then control passes to step 306; otherwise, control passes to step 302.

At step 306, it is determined whether the comparison item already belongs to another group. This determination can be accomplished in a variety of ways. For example, an item may have an associated group index which is initially set to a predefined value, e.g. −1, and then set to a second value when the item is assigned to a group. The second value can also indicate the group to which the item was assigned.

If the comparison item already belongs to a group, then control passes to step 302; otherwise, at block 312, the comparison item is added to the new group, e.g. the current item's group. At block 313, the current item is marked as belonging to the new group and at block 314 the group's bounding region is updated to include the bounding region of the comparison item. Thus, the group's new bounding region in essence becomes the union of the group's bounding region and the comparison item's bounding region.

In an alternative embodiment, steps 302–314 are performed for all items, whether editable or noneditable. In that case, at step 100, it is determined whether there are any more dialog items which need to be examined, irregardless of whether the items are editable or noneditable.

Figure 10:
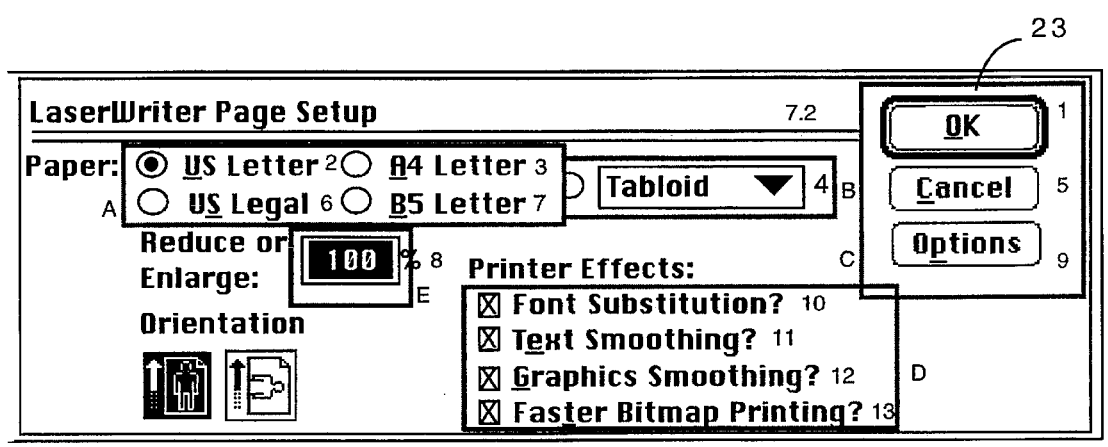
FIG. 10 illustrates an ordering of groups resulting from performing the steps of FIG. 9 on the dialog illustrated in FIG. 1A.

FIG. 10 shows the groups which result from applying the steps of FIGS. 8 and 9 on the dialog box of FIG. 1A. For descriptive purposes, the groups are delineated in boxes and labeled A, B, C and D. Applying the comparison function to the groups of FIG. 10 at step 106 of FIG. 4 to sort the groups produces a group order of C, A, B, E, D.

Since all of the items were sorted by position at step 102 of FIG. 4, the items are sorted within their groups. Thus, the focus ordering can be found by "iterating through" each group in sorted order from step 106 of FIG. 4 and listing each item in order at step 108 of FIG. 4. Preferably, this focus ordering is stored in storage 48 (FIG. 1) for subsequent use at runtime.

From FIG. 10, the following focus order can be determined by "iterating through" the sorted groups on an item by item bases: 1, 5, 9, 2, 3, 6, 7, 4, 8, 10, 11, 12, 13.

Figure 11:
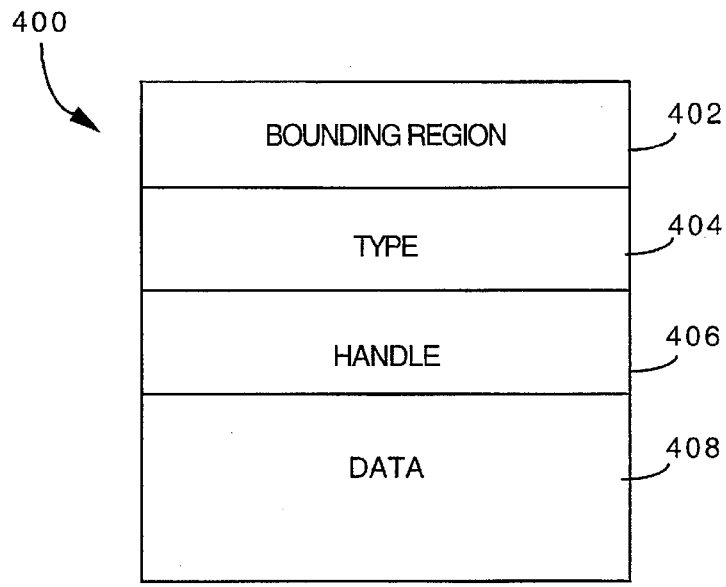
FIG. 11 illustrates an example of an item data structure.

FIG. 11 illustrates an example of an item data structure 400 that describes an item. As shown therein, the item data structure 400 includes a bounding region 402 and a type 404 and, optionally, a handle 406, a rectangle and data 408. The handle 406 contains a binary representation of the data to be displayed on the screen and is used to display data for the item. The handle varies from item to item. The data 408 is used to instantiate the item, i.e. to create it.

Figure 12:
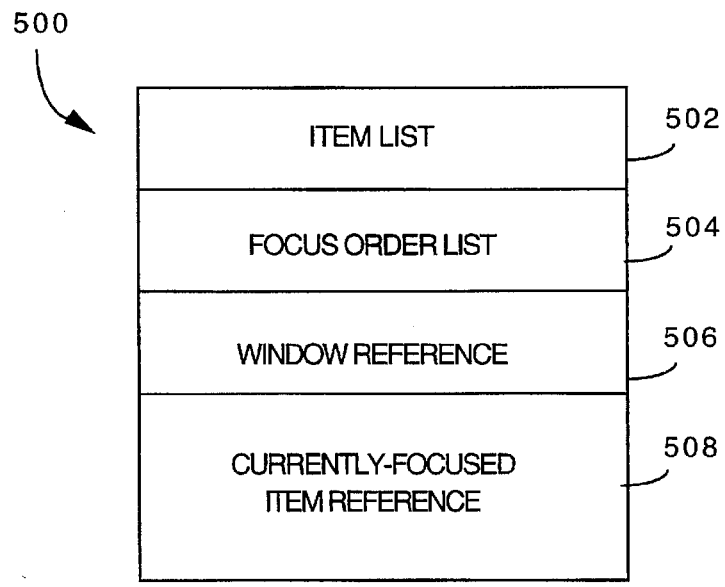
FIG. 12 illustrates an example of a dialog data structure.

FIG. 12 illustrates an example of a dialog data structure 500 that describes a dialog. A dialog data structure preferably includes, either directly or indirectly, an item list 502 and a focus order list 504. The item list 502 is a list of items in the dialog and is not in any particular order. The focus order list 504 indicates directly or indirectly the focus ordering of the items in the dialog. The focus order list 504 can be any appropriate data structure including, but not limited to, an array or linked list. The focus order list 504 can be for example an array of indices, each index being the location of the item in the item list 502.

Optionally, a dialog data structure 500 can include a window reference 506 which refers directly or indirectly to a window in which the dialog resides and a currently-focused item reference 508 which refers directly or indirectly to the item in the dialog at which the focus is currently directed. The currently focused item reference 508 can be used to save the item which is the current focus of a dialog when a dialog window is closed so that when the dialog window is reopened, the focus can be directed to that same item.

Figure 13:
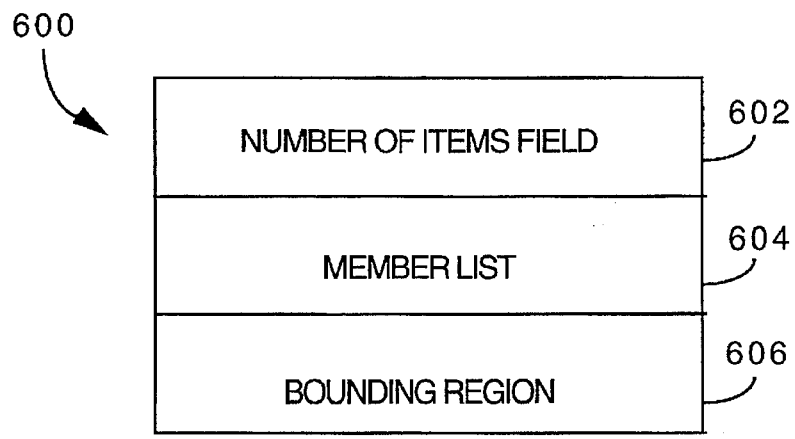
FIG. 13 illustrates an example of a group data structure.

FIG. 13 illustrates an example of a group data structure 600 that describes a group. A group data structure 600 preferably includes a number of items field 602, a member list 604, and a bounding region 606. The number of items field 602 specifies directly or indirectly the number of items in the group. The member list 604 references directly or indirectly the items which belong to the group. The bounding region 606 specifies directly or indirectly the bounding region of the group.

Figure 14:
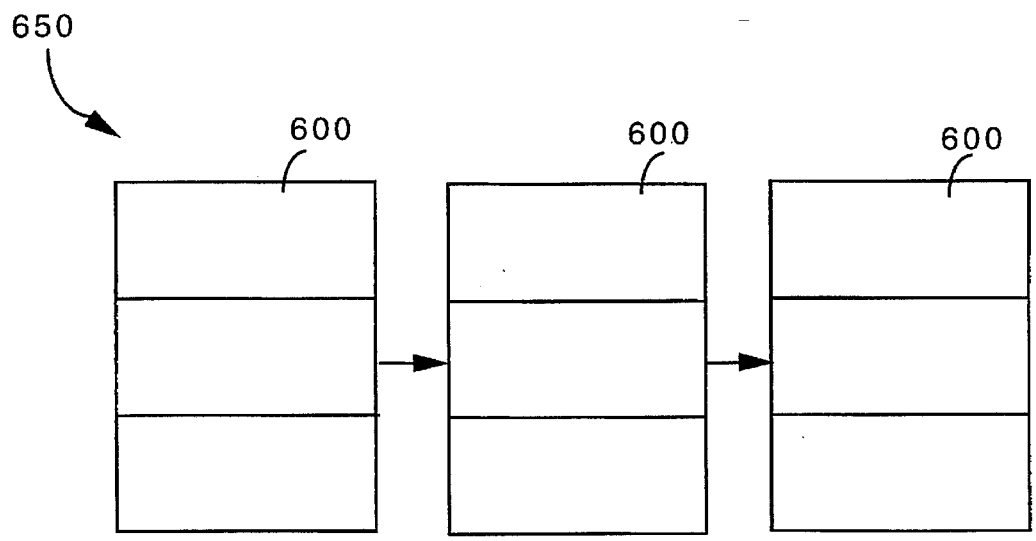
FIG. 14 illustrates an example of a group list.

FIG. 14 illustrates conceptually an example of a group list 650 that references the groups of the items in a dialog. The group list 650 can be any type of appropriate data structure such as an array or linked list. The group list 650 contains a plurality of group data structures 600, typically one per group.

In operation, the focus ordering for items in a dialog having a dialog data structure 500 is determined in the following manner. The comparison function is determined and used in conjunction with a sorting algorithm to sort the items in the item list 502 of the dialog data structure 500. The sorted items are stored in a suitable temporary data structure. The items are then grouped using the temporary data structure. When a new group is formed, a group data structure 600 is created, initialized and added to the group list 650. As items are added to the group, the number of items field 602, the member list 604 and the bounding region 606 in the group data structure 600 are updated accordingly. After the items are grouped, the groups are sorted using the comparison function in conjunction with a sorting algorithm. Depending on the implementation, the group list 650 is updated to reflect the ordered group list or another suitable data structure can be used. The focus ordering is then determined by going through in order the groups in the ordered group list, either group list 650 or other suitable data structure, and listing the items in each group in order.

The listing is preferably stored in the focus order list 504 of the dialog data structure 600. Generally, in a preferred embodiment, the focus ordering is stored simply as a serial list of items, without grouping information explicitly stated.

In use, with regard to the dialog box and focus ordering shown in FIG. 9, a determined focus ordering operates in the following manner at runtime of a software program displaying the dialog box. For descriptive purposes, the focus ordering of the items is indicated by the number to the left of the item. Groups of items are indicated by boxes, each box delineating a separate group. For simplicity, during the following description an item will be referred to by its focus ordering number.

As a user signals to the program to change the focus ordering, e.g. presses a tab key on the keyboard, the input focus changes accordingly, thereby allowing a user to navigate through the items in the items and to edit an item when it is the current input focus. Typically, the input focus is initially on the first item in the dialog, but in some implementations, the initial input focus may be placed on an item other than the first item. Thus, if the input focus is on item 2 (US Letter) and the user signals a change in the input focus, the input focus changes to item 3 (A4 Letter). If the user then again signals a change in the input focus, the input focus changes to item 6 (US Legal).

When the focus input is on the last item in a group and the user signals a change in focus input, the focus input shifts to the first item in the next group. For example, if the focus input is on item 7 (B5 Letter) and the user signals a change in the input focus, the input focus shifts to item 4 (Tabloid). When the focus input is on the last item in the dialog and the user signals a change in focus input, the focus input shifts to the first item in the dialog. For example, if the focus input is on item 13 (Faster Bitmap Printing?) and the user signals a change in the input focus, the input focus shifts to item 1 (OK).

This example shows the intuitive and logical focus ordering provided by the invention. In this case, the editable items related to the type of paper to be used during the printing operation are grouped together and the Printer effects editable items are grouped together. Moreover, the action-oriented editable items OK and Cancel and Options are grouped together.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for automatically generating a focus order for items in a dialog on a computer system, the computer system having a processor, storage and a display device having a display screen, said method comprising the steps of:

sorting said items of said dialog by means of a spatial comparison function;

grouping said items of said dialog into one or more groups, an item being assigned to a group according to the item's location on the display screen, each item being in a single group, each group containing one or more items;

sorting said groups by said comparison function; and listing said focus ordering of said items to form a focus order list by iterating through said groups in sorted order, for each group iterating through the items of the group in sorted order.

2. A method as defined in claim 1 further comprising of the step of storing said focus order list in said storage.

3. A method as defined in claim 1 wherein said step of grouping said items is further based on the type of the items, whereby an item is assigned to a group based on the location of the item on the display screen and the type of the item.

4. A method as defined in claim 3 wherein items which are horizontally-aligned and of similar type are grouped together.

5. A method as defined in claim 3 wherein items which are vertically-aligned and of similar type are grouped together.

6. A method as defined in claim 1 further comrising the step of dynamically determining a spatil comparison function and using that function for sorting of items and groups.

7. An apparatus for automatically generating a focus order for items in a dialog in a computer system having a processor and a storage, said apparatus comprising:

means for sorting said items of said dialog by means of a spatial comparison function;

means for grouping said items of said dialog into one or more groups an item being assigned to a group according to the item's location on the display screen, each item being in a single group, each group containing one or more items;

means for sorting said groups by said comparison function; and means for listing said focus ordering of said items to form a focus order list by iterating through said groups in sorted order, for each group iterating through the items of the group in sorted order.

8. An apparatus as defined in claim 7 further comprising means for storing said focus order list in said storage.

9. An apparatus as defined in claim 7 wherein said grouping of said items is further based on the type of the items, whereby an item is assigned to a group based on the location of the item on the display screen and the type of the item.

10. An apparatus as defined in claim 9 wherein items which are horizontally-aligned and of similar type are grouped together.

11. An apparatus as defined in claim 9 wherein items which are vertically-aligned and of similar type are grouped together.

12. An apparatus as defined in claim 7 further comprising means for dynamically determining a spatial comparison function and using that function for sorting of items and groups.

13. A method for automatically generating a focus order for items in a dialog on a computer system, the computer system having a processor, storage and a display device having a display screen, said method comprising the steps of:

sorting said items of said dialog by means of a spatial comparison function;

grouping said items of said dialog into one or more groups, the grouping of items being based on the relative spatial relationships of the items, each group containing one or more items;

sorting said groups by said comparison function; and listing said focus ordering of said items to form a focus order list by iterating through said groups in sorted order, for each group iterating through the items of the group in sorted order.

14. An apparatus for automatically generating a focus order for items in a dialog on a computer system, the computer system having a processor, storage and a display device having a display screen, said method comprising the steps of:

means for sorting said items of said dialog by means of a spatial comparison function;

means for grouping said items of said dialog into one or more groups, the grouping of items being based on the relative spatial relationships of the items, each group containing one or more items;

means for sorting said groups by said comparison function; and means for listing said focus ordering of said items to form a focus order list by iterating through said groups in sorted order, for each group iterating through the items of the group in sorted order.

15. A computer-readable medium containing program instructions for causing a computer to perform the steps of:

sorting said items of said dialog by means of a spatial comparison function;

grouping said items of said dialog into one or more groups, an item being assigned to a group according to the item's location on a display screen of a display device, each item being in a single group, each group containing one or more items;

sorting said groups by said comparison function; and listing said focus ordering of said items to form a focus order list by iterating through said groups in sorted order, for each group iterating through the items of the group in sorted order.

16. A computer-readable medium as defined in claim 15 further comprising instructions for causing the computer to perform the step of storing said focus order list in said storage.

17. A computer-readable medium as defined in claim 15 wherein said step of grouping said items is further based on the type of the items, whereby an item is assigned to a group based on the location of the item on the display screen and the type of the item.

18. A computer-readable medium as defined in claim 17 wherein items which are horizontally-aligned and of similar type are grouped together.

19. A computer-readable medium as defined in claim 17 wherein items which are vertically-aligned and of similar type are grouped together.

20. A computer-readable medium as defined in claim 15 further comprising instructions for causing the computer to perform the step of dynamically determining a spatial comparison function and using that function for sorting of items and groups.

21. A computer-readable medium containing program instructions for causing a computer to perform the steps of:

sorting said items of said dialog by means of a spatial comparison function;

grouping said items of said dialog into one or more groups, the grouping of items being based on the relative spatial relationships of the items, each group containing one or more items;

sorting said groups by said comparison function; and listing said focus ordering of said items to form a focus order list by iterating through said groups in sorted order, for each group iterating through the items of the group in sorted order.

22. A computer-readable medium as defined in claim 21 wherein said step of grouping said items is further based on the type of the items, whereby an item is assigned to a group based on the location of the item on the display screen and the type of the item.

23. A computer-readable medium as defined in claim 22 wherein items which are horizontally-aligned and of similar type are grouped together.

24. A computer-readable medium as defined in claim 22 wherein items which are vertically-aligned and of similar type are grouped together.

* * * * *

UNITED STATES PATENT AND TRADEMARK OFFICE
CERTIFICATE OF CORRECTION

PATENT NO    :    5,625,763

DATED         :    April 29, 1997

INVENTOR(S) :    Lewis K. Cirne

It is certified that error appears in the above-identified patent and that said Letters Patent is hereby corrected as shown below:

In the claims:

In claim 2, line 1, delete "comprising of" and insert therefor
- -comprising- -.

In claim 6, line 2, delete "spatil" and insert therefor - -spatial- -.

In claim 7, line 7, delete "more groups an" and insert therefor
- -more groups, an- -.

Signed and Sealed this

Ninth Day of March, 1999

Attest:

Q. TODD DICKINSON

Attesting Officer

Acting Commissioner of Patents and Trademarks